United States Patent [19]
Yamaguchi et al.

[11] Patent Number: 5,879,047
[45] Date of Patent: Mar. 9, 1999

[54] WIRE HARNESS INSTALLATION STRUCTURE FOR VEHICLE DOOR

[75] Inventors: Noboru Yamaguchi; Yasuyoshi Serizawa; Keizo Nishitani; Shuji Takiguchi, all of Shizuoka, Japan

[73] Assignee: Yazaki Corporation, Tokyo, Japan

[21] Appl. No.: 908,635

[22] Filed: Aug. 7, 1997

[30] Foreign Application Priority Data

Aug. 8, 1996 [JP] Japan ..................................... 8-209977

[51] Int. Cl.⁶ ......................................................... B60J 5/04
[52] U.S. Cl. ............................................................. 296/146.7
[58] Field of Search ................................ 296/152, 146.7, 296/146.12

[56] References Cited

U.S. PATENT DOCUMENTS

| | | | |
|---|---|---|---|
| 4,653,799 | 3/1987 | Arai et al. | 296/146.12 |
| 4,862,011 | 8/1989 | Wright | 296/152 |
| 5,716,044 | 2/1998 | Peterson et al. | 296/152 |

FOREIGN PATENT DOCUMENTS 59-23224  2/1984  Japan.

Primary Examiner—Gary C. Hoge
Attorney, Agent, or Firm—Armstrong, Westerman, Hattori, McLeland & Naughton

[57] ABSTRACT

A structure for installing a wire harness within a vehicle door, wherein a wire harness is placed obliquely alongside the vehicle door and swingingly supported at a vertical position to avoid the stress of the wire harness to be caused when the door is opened or closed. The swinging portion of the wire harness is passed through the swinging portion of a protector. One end of the swinging portion of the wire harness is rotatably connected to a sliding portion of the protector and the other end of the swinging portion is rotatably supported at the vehicle door side. The position at which the swinging portion of the wire harness is supported is set to be the center of a range in which the protector slides. A case fitted into a door panel or formed integrally with a door trim and a cover hinged to the case can be employed to enclose the protector and the swinging portion of the wire harness fixed to a clamp holding portion with use of a clamp.

12 Claims, 10 Drawing Sheets

WIRE HARNESS INSTALLATION STRUCTURE FOR VEHICLE DOOR

FIELD OF THE INVENTION

The present invention relates to a structure for installing a wire harness within a vehicle door that prevents a wire harness, which interconnects electric circuits mounted in a vehicle body and doors of the vehicle, from damage to be caused by bending when the doors are opened and closed.

DESCRIPTION OF THE PRIOR ART

FIGS. 17 and 18 show a structure of a conventional wire harness to be installed in a vehicle door which is disclosed in the Japanese Utility Model Application Laid Open No. SHO 59-23224. In this structure, a wire harness 126 is inserted through a check link arm 125 extending from the body 122 of a vehicle into the interior of the vehicle door 123 through the hinge mounting surface 124 of the door 123. When the door is closed as shown in FIG. 17, the wire harness 126 is fixed at its stationary support 127 so as to be crooked for loosening at the inside the door, while the wire harness 126 not being pulled when the door is opened as shown in FIG. 18.

The check link arm 125 enables the door 123 to be operated in two steps for opening and closing. The check link arm 125 has a front end 125a fixed to the vehicle body 122, an intermediate portion slidable along a guide 128, and a rear end 125b movable freely within the door 123. The wire harness 126 is guided through the check link arm 125. The wire harness 126 extends from the rear end 125b of the check link arm 125 and is loosely fixed to the door at its stationary support 127.

However, in the aforementioned conventional structure, the wire harness 126 is bent with an acute angle at the stationary support 127 when the door is closed as shown in FIG. 17 and is stretched at the stationary support 127 when the door is opened as shown in FIG. 18, so there has been an apprehension that the wire harness 126 might be damaged by repeated opening and closing of the door.

Accordingly, it is an object of the present invention to provide a structure for installing a wire harness within a vehicle door for preventing the wire harness, at the vehicle door side, from a damage to be caused by repeated operations of opening and closing of the door.

SUMMARY OF THE INVENTION

To achieve the aforementioned objective, according to one aspect of the present invention, there is provided a structure for installing a wire harness within a vehicle door wherein an intermediate portion of the wire harness is attached to the side of the vehicle door in such a manner that the wire harness can slide freely and one end of the wire harness is communicated with the side of a vehicle body, and a guide-out portion of the wire harness where is continued to the slidable attachment is installed obliquely upward or downward alongside the door panel and supported, at a position perpendicular to a direction in which of the wire harness slides, for allowing the guide-out portion of the wire harness to swing in accordance with the sliding movement of the wire harness. The wire harness may be guided out through a protector which is mounted slidably on the side of the door.

According to another aspect of the present invention, there is provided a structure for installing a wire harness within a vehicle door wherein a wire harness is inserted into a protector one end of which is attached to the side of the vehicle door in such a manner that the protector can be slidable freely and the other end of which is communicated with the side of a vehicle body, a guide-out portion of the wire harness which is guided out from a sliding portion of the protector is inserted into a swinging portion of the protector, and one end of the swinging portion is connected to the sliding portion of the protector so that it can be rotatable freely while the other end of which is supported rotatably on the side of the door. A supporting point of the wire harness in a horizontal direction is set to the center of a sliding range of the protector. A slide engaging portion which engages with a connecting shaft of the sliding portion or a supporting shaft on the side of the door is formed either on one end or the other end of the swinging portion.

According to still another aspect of the present invention, there is provided a structure for installing a wire harness within a vehicle door wherein a wire harness is guided out through a protector and supported so that it can swing at a position perpendicular to a direction in which the protector slides, the protector is engaged with a case in a freely slidable manner, a wire harness supporting shaft is protruded from either the case portion or a cover portion therefor, and an abutting portion is provided in either the case portion or the cover portion so that it can be abutted against the harness supporting shaft. The case can be fitted into a recess portion formed in a door panel or provided integrally with a door trim.

According to yet another aspect of the present invention, there is provided a structure for installing a wire harness within a vehicle door wherein a wire harness is guided out through a protector and supported so that it can swing at a position perpendicular to a direction in which the protector slides, the wire harness is fixed to a clamp holding portion by a clamp portion which constitutes a supporting point for the wire harness to swing. The clamp portion has a harness insertion groove and a harness fixing portion and is fixed to the clamp holding portion by a fixing means. It is also possible for the clamp portion to have a flexible semi-cylindrical portion into which the wire harness can be inserted, and the semi-cylindrical portion is force fitted into the clamp holding portion. Further, the clamp portion may consists of a portion of the wire harness which is bulged with an embedded piece member, and the clamp holding portion may have an engaging recess portion for the bulged portion of the wire harness.

BRIEF DESCRIPTION OF THE DRAWINGS

The above and other objects and advantages will become apparent from the following detailed description when read in conjunction with the accompanying drawings wherein.

DETAILED DESCRIPTION OF THE PREFERRED EMBODIMENTS

Figure 1:
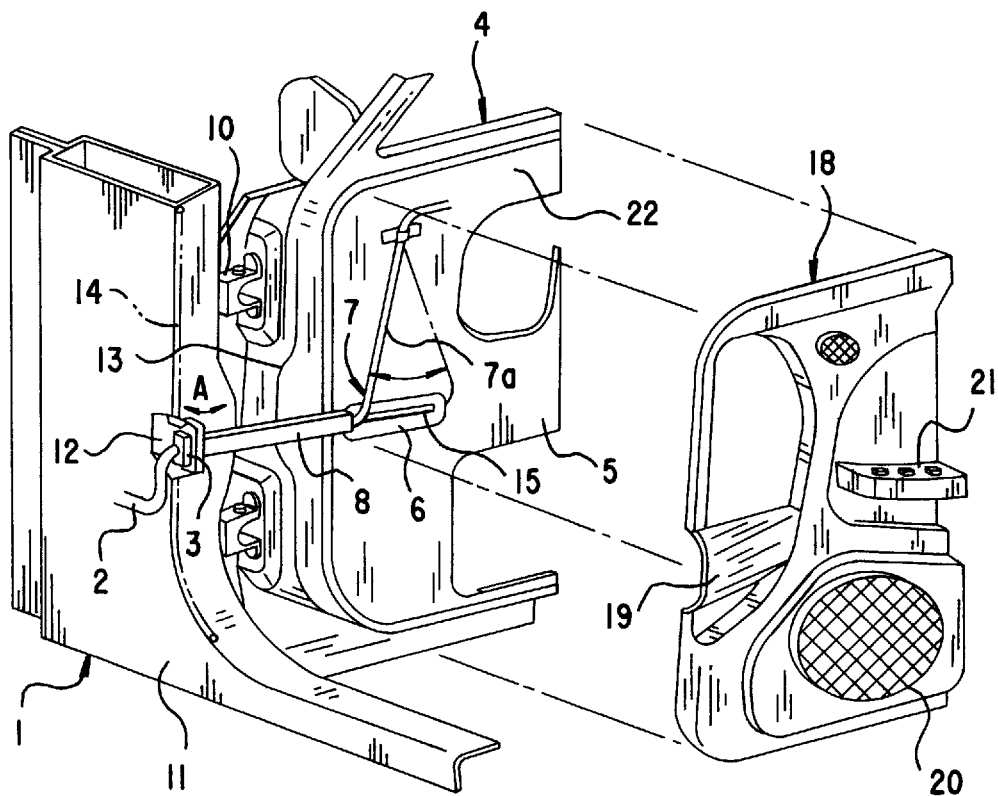
FIG. 1 is an exploded perspective view showing a first embodiment of a structure for installing a wire harness within a vehicle door according to the present invention.

Referring to FIG. 1, there is shown a structure for installing a wire harness within a vehicle door in accordance with a first embodiment of the present invention. The body 1 of a vehicle is provided with a connector 3 for a body-side wire harness 2 in a freely rotatable manner. A horizontal slide guide 6 is provided on the inner door panel 5 of a vehicle door 4. A rigid protector 8 made of synthetic resin is provided around a door-side wire harness 7. One end of the protector 8 is bonded to a connector 9 (see FIG. 2) of the door-side wire harness 2, and the door-side connector 9 engages with the body-side connector 3. The other end of the protector 8 engages with the slide guide 6 so that the protector 8 can freely slide along the guide 6. As the door 4 is rotated about hinges 10, the protector 8 slides on the slide guide 6.

The aforementioned connector 3 is provided on a bracket 12 fixed to the inner wall 11 of the vehicle body 1 so that the connector 3 is freely rotatable in a direction indicated by an arrow A. The connector 3 and the connector 9 engages with each other and are connected together at the inner side of weather strips 13 and 14 provided at the door side and vehicle body side.

Figure 2:
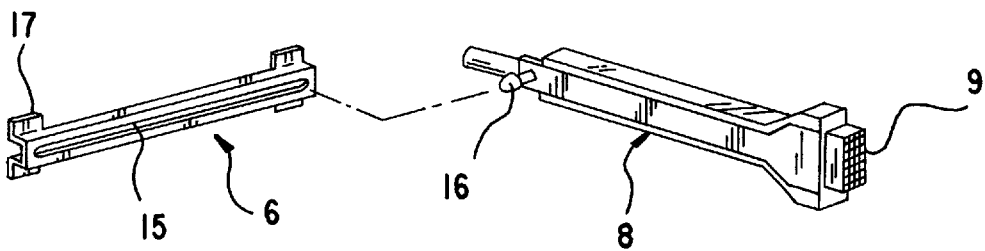
FIG. 2 is an exploded perspective view showing a protector and a sliding guide of FIG. 1.

The protector 8 and the slide guide 6 are constructed as shown in FIG. 2. The wire harness 7 is passed through the protector 8 and connected to the connector 9 at the front end of the protector 8. Thus, the wire harness 7 is held straight within the rigid protector 8 so as not to be crooked. The rear end of the protector 8 is provided with a mushroom-shaped protrusion 16 which engages with a guide slot 15 so that the protrusion 16 is slidable along the slide guide 6.

As shown in FIG. 2, the cross section of the slide guide 6 is formed into a generally U-shape, and the guide slot 15 is formed at the central portion of the U-shaped slide guide 6 extending in lateral direction. The slide guide 6 has fixture plates 17 at the front and rear ends and is fixed to the inner door panel 5 with the fixture plates 17 by using bolts.

In FIG. 1 it is also possible to provide the slide guide 6 not on the inner door panel 5 but on a door trim 18. The door trim 18 is bulged to provide a protector accommodating portion 19 and is provided with a speaker 20 and a switch assembly 21. The protector 8 is accommodated in a space between the inner door panel 5 and the door trim 18 when the door 4 is closed.

In FIG. 1 the slide guide 6 is fixed horizontally to the central part of the inner door panel 5 in a vertical direction. The inner door panel 5 is lined with a waterproof sheet 22 made of synthetic resin, and the slide guide 6 is attached to the inner door panel 5 through the waterproof sheet 22.

Figure 3:
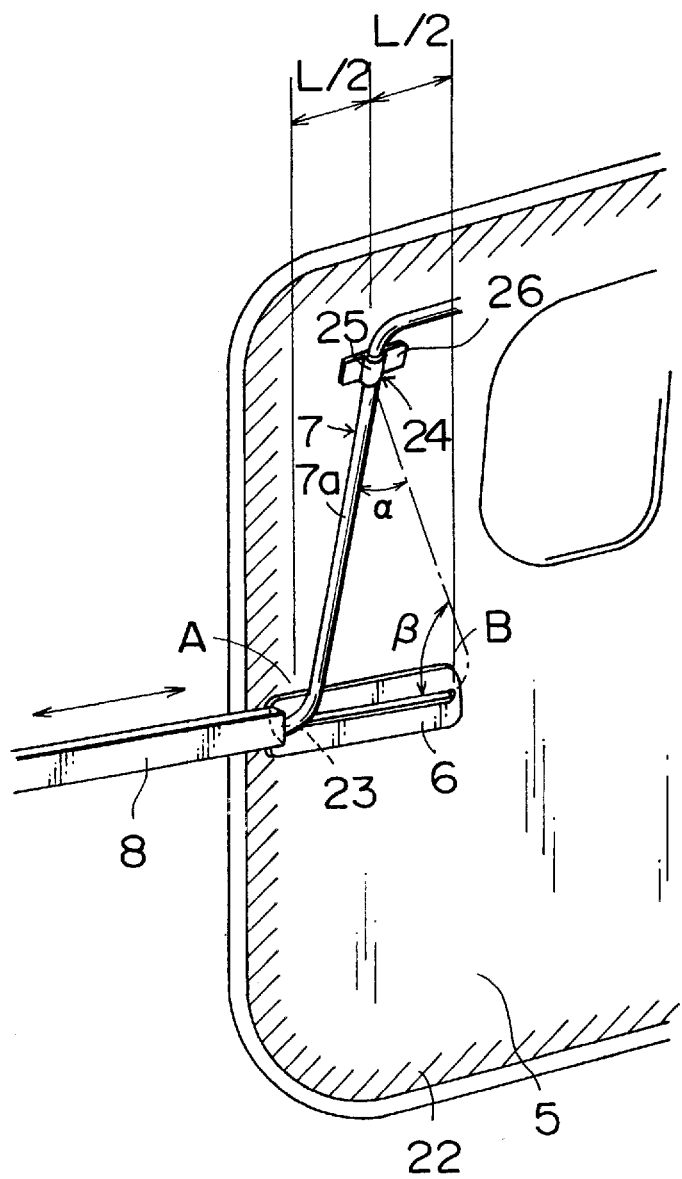
FIG. 3 is an enlarged perspective view showing the essential part of the first embodiment of the structure for installing the wire harness within the vehicle door.

FIG. 3 is an enlarged perspective view showing the essential part of the structure for installing a wire harness within a vehicle door shown in FIG. 1. The wire harness 7 on the door side is passed through the protector 8 and guided out from the opening 23 of the rear end of the protector 8. Furthermore, the wire harness 7 is arranged obliquely toward the upper rear portion of the inner door panel 5 and is fixed to the upper portion of the inner door panel 5 by a clamp 24. The horizontal position of the clamp 24 is set approximately at a halfway between the advanced position A and the retracted position B of the rear end of the protector 8 on the slide guide 6.

That is, the clamp 24 is arranged at a position of approximately one half (½) of the sliding length L of the protector 8. If the vertical position of the clamp 24 is the far from the slide guide 6 the smaller a swinging angle α of the outgoing portion 7a of the wire harness 7 and the larger a bending angle β between the outgoing portion 7a and the protector 8. Consequently, it becomes difficult for the wire harness 7 to be damaged.

The aforementioned clamp 24 is constituted by a curved hold-down part 25 through which the wire harness 7 is inserted and a pair of stationary supports 26 protruding from both sides of the hold-down part 25. The stationary supports 26 are fixed horizontally to the inner door panel 5 by means of bolts (not shown). The wire harness 7 further extends from the clamp 24 to the rear portion of the door panel 5 and is connected to an auxiliary part, connector, and the like (not shown) within the door 4 (FIG. 1).

When the door 4 is closed or opened and the protector 8 slides horizontally along the slide guide 6, the outgoing portion 7a of the wire harness 7 swings about the hold-down part 25 of the clamp 24, as a supporting point, with an angle of α along the surface of the inner door panel 5. The outgoing portion 7a of the wire harness 7 traces a locus of isosceles triangle. More specifically, when the door is opened, the outgoing portion 7a of the wire harness 7 is nearly straightened at the advanced position A of the protector 8 without loosening and, at the midway of closing the door, the outgoing portion is slightly loosened by an amount which is equal, at the most, to a difference given by subtracting the height of the isosceles triangle from the oblique side thereof and then straightened again at the retracted position B of the protector 8.

The outgoing portion 7a of the wire harness 7 smoothly swings on the center of the clamp 24 along the surface of the inner door panel 5. Since the outgoing portion 7a is not loosened significantly while it is swinging, there are caused no rubbing, no catching and the like at the door panel 5 or at the door trim 18. Further, since the clamp 24 at where the outgoing portion 7a swings is apart considerably from the slide guide 6 in a vertical direction (height direction), the bending angle β between the protector 8 and the outgoing portion 7a of the wire harness 7 becomes larger and therefore the wire harness 7 is not damaged.

Note that the clamp 24 may be provided at the lower portion of the door panel 5 and then the outgoing portion 7a of the wire harness 7 may be installed downward so as to be directed obliquely from the protector 8 to the lower portion of the door panel 5. The slide guide 6 and the clamp 24 may also be provided on the door trim 18. In addition, the intermediate portion of the wire harness 7 can be engaged with the slide guide 6 by employing another means without using the protector 8. Furthermore, the intermediate portion of the wire harness 7 may be engaged with the door side so that it can be freely slidable. In this case, the outgoing portion 7a extends from a slidable engaging portion (not shown).

Figure 4:
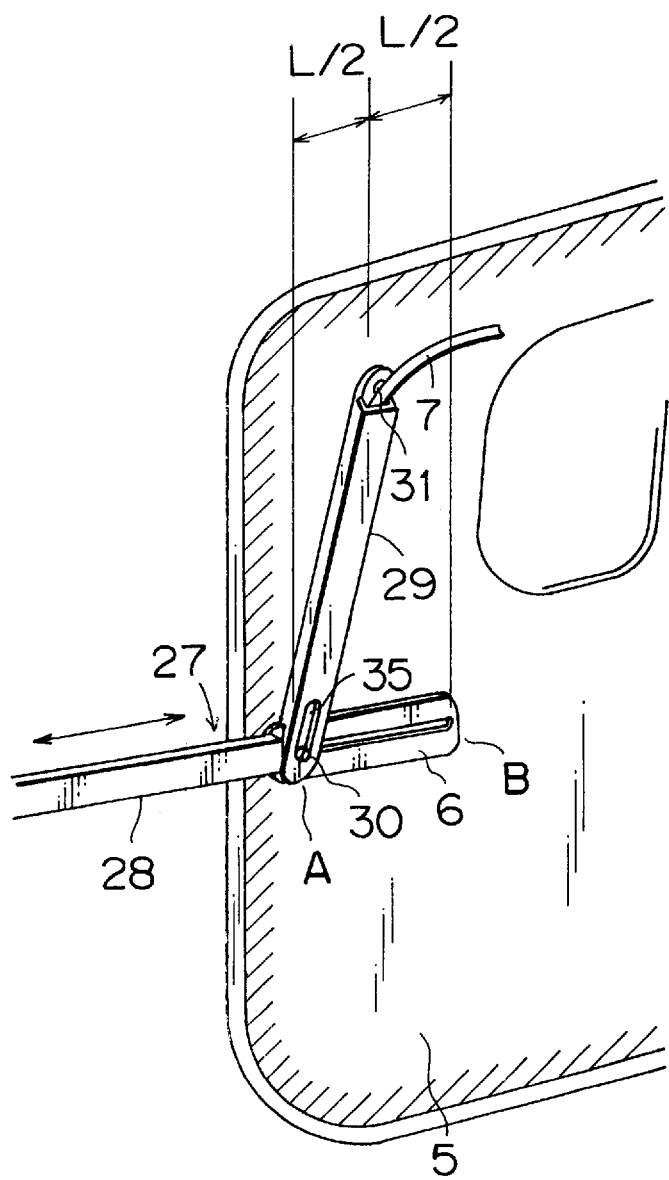
FIG. 4 is a perspective view showing a second embodiment of a structure for installing a wire harness within a vehicle door.
Figure 5:
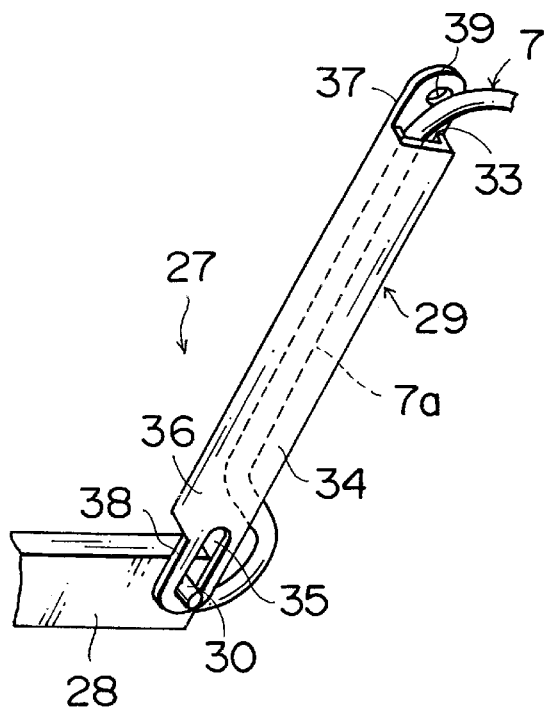
FIG. 5 is a perspective view showing a protector having a swinging portion.

FIGS. 4 and 5 illustrate a second embodiment of the structure for installing a wire harness within a vehicle door. This structure is characterized in that the outgoing portion (swinging portion) 7a of the wire harness 7 is covered with the swinging portion 29 of a protector 27. The swinging portion 29 is coupled with the slide portion 28 of the protector 27. The slide portion 28 and the swinging portion 29 as a whole constitute the protector 27.

The swinging portion 29, as in the slide portion 28, is made of synthetic resin and formed into a tubular shape with rectangular section. One end (lower end) of the swinging portion 29 is connected to the rear end of the slide portion 28 with use of a short column like (pin-shaped) connecting shaft 30, while the other end (upper end) is supported on the door panel 5 by a supporting shaft 31 so that the swinging portion 29 can freely rotate thereabout. The horizontal position of the supporting shaft 31 is positioned substantially at the center distance of the slide guide 6. That is, the supporting shaft 31 is positioned at a position of approximately ½ of the sliding distance L of the slide portion 28. The outgoing portion 7a (FIG. 5) of the wire harness 7 is inserted through the swinging portion 29 and guided out from the upper opening 33 of the swinging portion 29 into a horizontal direction.

As shown in FIG. 5, a slot (elongated hole) 35 in a longitudinal direction is formed at the lower end portion of the front wall 34 of the swinging portion 29, and the connecting shaft 30 is inserted into the slot 35. The connecting shaft 30 protrudes from the rear end of the slide portion 28. The side walls 36 and rear wall 37 of the swinging portion 29 around the slot 35 are removed to form a cut out, and the slide portion 28 extends into this cutout 38. The upper end portion of the rear wall 37 of the swinging portion 29 is provided with a circular insertion hole 39 through which the supporting shaft 31 (FIG. 4) is inserted. The side walls 36 and the front wall 34 of the swinging portion 29 around the insertion hole 39 is also removed to form a cut out to form an upper opening 33 from which the outgoing portion 7a of the wire harness 7 is taken out. The swinging portion 29 swings in synchronization with the movement of the slide portion 28.

Figure 6:
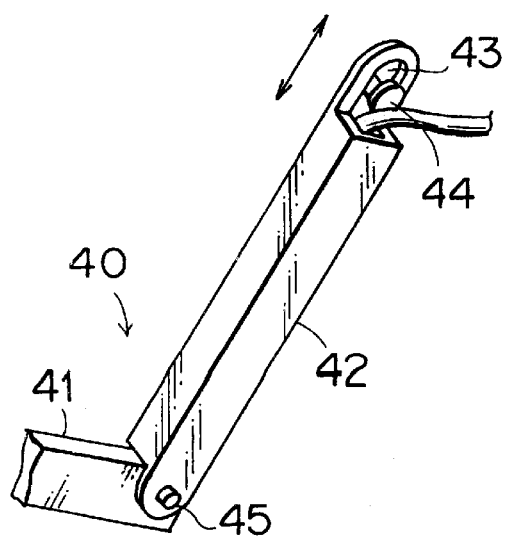
FIG. 6 is a perspective view showing a modification of the protector.

FIG. 6 shows a modification of the aforementioned protector. This structure is characterized in that the upper end portion of the swinging portion 42 of a protector 40 is provided with a slot (elongated hole) 43 in a longitudinal direction and a supporting shaft 44, such as a bolt, is inserted into the slot 43 to support the swinging portion 42 on the door panel 5. The lower end of the swinging portion 42 is connected to the slide portion 41 of the protector 40 by means of a connecting shaft 45 so that the swinging portion 42 is freely rotatable.

Figure 7:
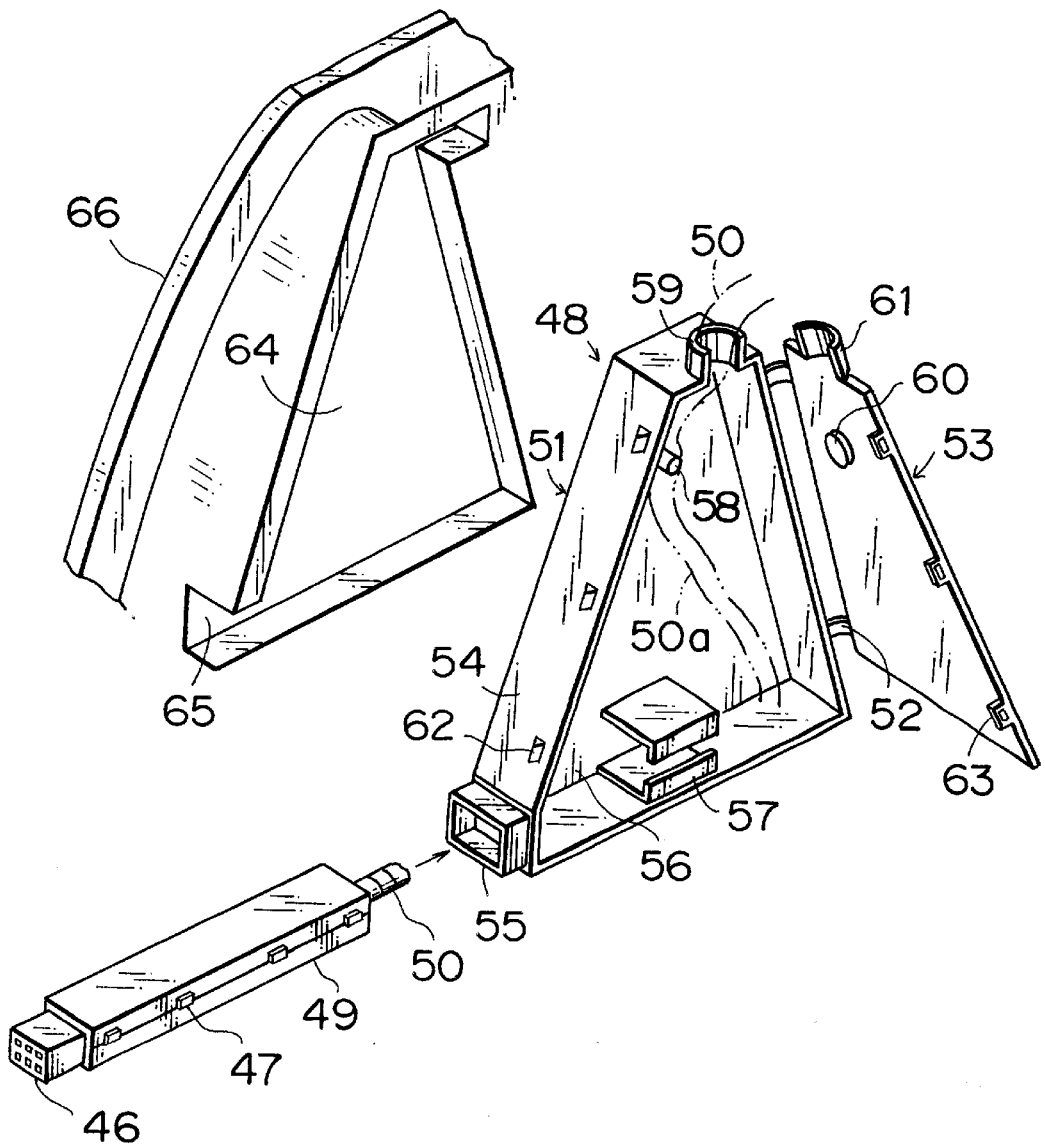
FIG. 7 is an exploded perspective view showing a third embodiment of a structure for installing a wire harness within a vehicle door.

FIG. 7 shows a third embodiment (a structure for housing the swinging portion of a wire harness) of the structure for installing a wire harness within a vehicle door. This structure is characterized in that a harness protector 49 is slidably engaged with a generally triangular or trapezoidal synthetic resin case 48 and a wire harness 50, guided through the protector 49, is supported within the case 48 so that it can swing freely.

The case 48 is constituted by a case body 51 and a cover 53 which can be opened and closed freely with use of a hinge 52. The lower part of the inclined side wall 54 of the case body 51 is provided with a guide opening 55 through which the protector 49 is inserted. A pair of generally L-shaped slide guides 57 project from the rear wall 56 of the case body 51 so that the center axis of the slide guides 57 is aligned with that of the guide opening 55.

The protector 49 integrally has a connector 46 and can be divided or united by fixture means 47. The protector 49 is inserted into the case 48 through the aforementioned guide opening 55 and is further into the opening formed by the slide guides 57. The guide opening 55 and the slide guides 57 may be provided with cutouts (not shown) for harness insertion.

A pin-shaped harness supporting shaft 58 protrudes from the upper portion of the rear wall 56, and a half cut guide opening 59 is formed above the supporting shaft 58. The aforementioned cover 53 is provided with an abut projection 60 which abuts the supporting shaft 58 and another half cut guide opening 61 which is coupled with the half cut guide opening 59 to form a wire harness guide opening. The cover 53 is fastened to the case body 51 by engaging protrusions 62 with hooks 63.

A case accommodating recess 64 and a protector insertion recess 65 are formed on an outer door panel 66 by a pressing operation, and the case 48 is fitted into the outer door panel 64.

Figure 8:
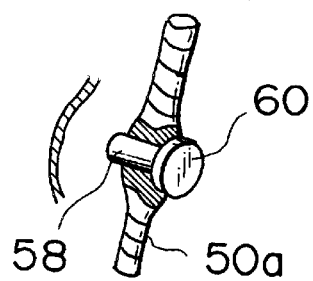
FIG. 8 is a perspective view showing a wire harness supporting structure of FIG. 7.

As shown in FIG. 8, the outgoing portion 50a of the wire harness 50, positioned within the case 48, is penetrated through, at the center, by the supporting shaft 58 so that the outgoing portion 50a can freely swing. By closing the cover 53, the abutting protrusion 60 abuts the head of the supporting shaft 58 and, therefore, the wire harness 50 is prevented from slipping out of the supporting shaft 58. The case 48 is formed integrally with the slide guides 57, the supporting shaft 58 and the cover 53 and, consequently, the case 48 is inexpensively fabricated.

Figure 9:
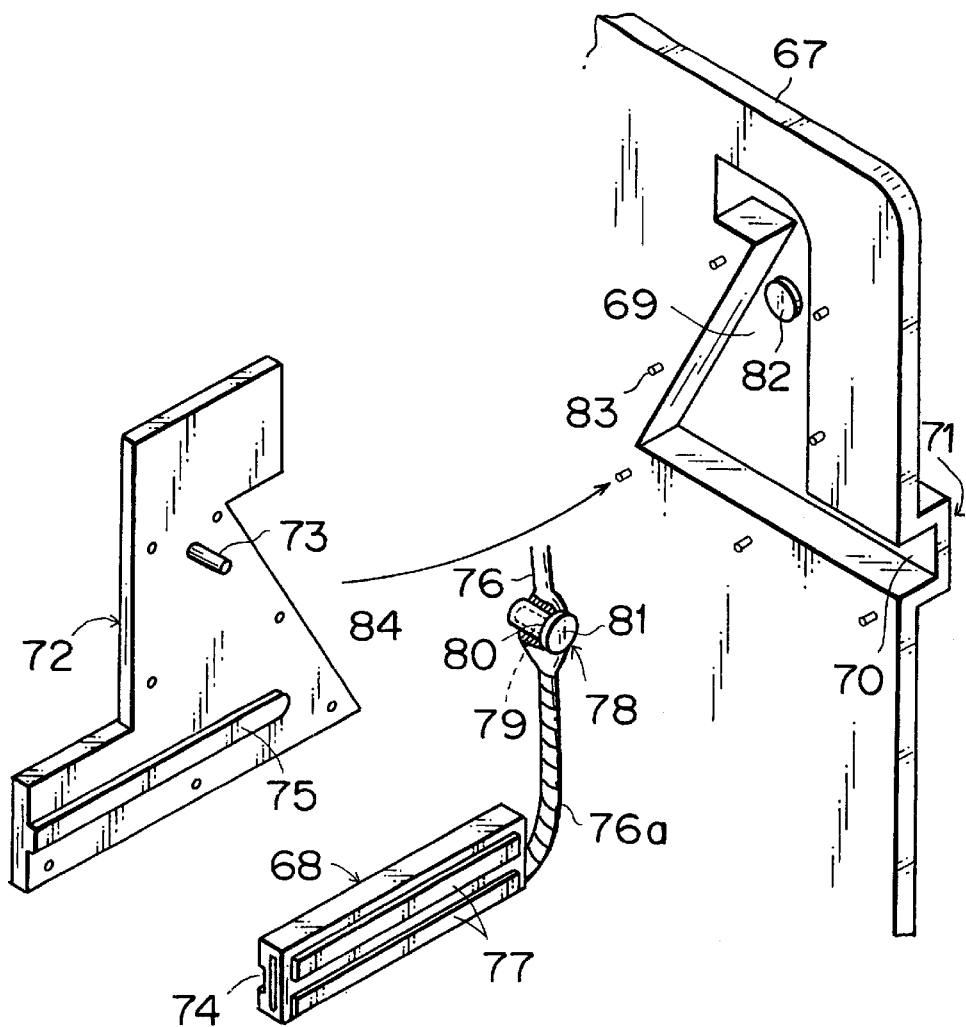
FIG. 9 is an exploded perspective view showing a fourth embodiment of a structure for installing a wire harness within a vehicle door.
Figure 10:
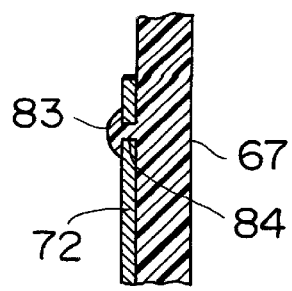
FIG. 10 is a vertical sectional view showing a method of fastening a cover.

FIGS. 9 and 10 illustrate a fourth embodiment (a structure for accommodating the swinging portion of a wire harness) of the structure for installing a wire harness within a vehicle door. This structure is characterized in that a wire harness protector 68 and a wire harness supporting portion 73 are provided on the side of a door trim 67. The door trim 67 is formed integrally with a case 71 having both a triangular recess 69 and a protector insertion groove 70 continued to the recess 69. The wire harness supporting shaft 73 is formed on the upper portion of a cover 72 which engages with the recess 69. A protruded guide rail 75 formed on the lower portion of the cover 72 engages with a guide groove 74 of the protector 68.

A supporting member 78 is arranged in such a manner to penetrate through the outgoing portion (swinging portion) 76a of a wire harness 76 and is supported by the supporting shaft 73 of the cover 72 so as to be rotatable freely thereabout. The supporting member 78 is constituted by a shaft portion 80 having a hole 79 to be coupled with the supporting shaft 73 and a disk-shaped head 81 continued to the shaft portion 80. An abutting protrusion 82 formed on the recess 69 abuts the head 81 of the supporting member 78. Note that the wire harness 76, as in the aforementioned embodiment (FIG. 7), may be supported by the supporting shaft 73 and the abutting protrusion 82 without employing the supporting member 78.

The protector 68 is provided with slide protrusions 77 and the guide groove 74 in a longitudinal direction of the protector 68. The slide protrusions 77 engage with the protector insertion groove 70 and the recess 69 of the door trim 67. The guide groove 74 engages with the guide rail 75 of the cover 72. The protector 68 has a connector (not shown) integrally formed at the front end thereof.

Anchor pins 83 protrude from the door trim 67 around the recess 69, and the cover 72 is provided with insertion holes 84 into which the anchor pins 83 are inserted. As shown in FIG. 10, the cover 72 is first mounted on the recess 69 of the door trim 67 and then the anchor pins 83 are melted at their head portions to firmly fix the cover 72 to the door trim 67. Within the recess 69, the wire harness 76 is swung back and forth on the supporting member 78 by the sliding movement of the protector 68.

According to the aforementioned fourth embodiment, the number of components are reduced, space is economized, and assembling work is simplified.

Figure 11:
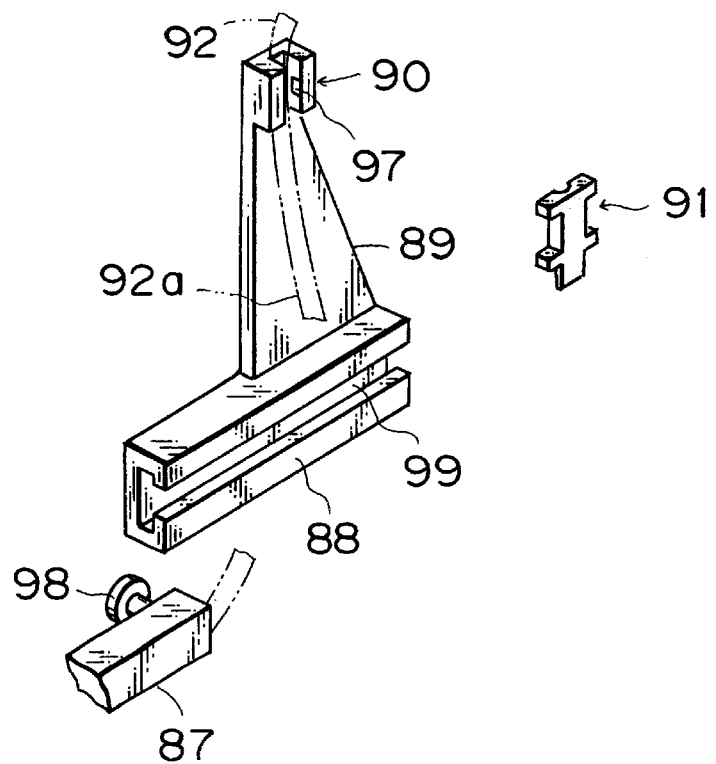
FIG. 11 is an exploded perspective view showing a fifth embodiment of a structure for installing a wire harness within a vehicle door.
Figure 12:
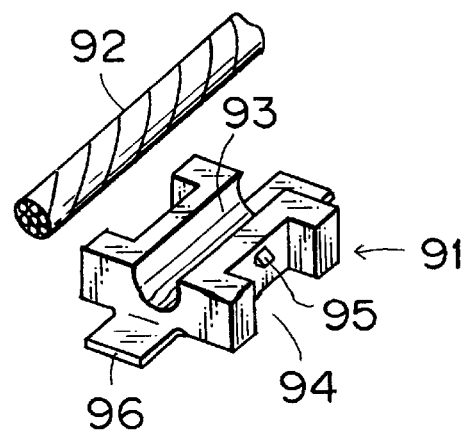
FIG. 12 is an exploded perspective view showing a wire harness supporting portion of FIG. 11.

FIGS. 11 and 12 illustrate a fifth embodiment, a structure for accommodating the swinging portion of a wire harness, of the structure for installing a wire harness within a vehicle door. In this structure, a triangular supporting plate 89 is formed integrally on a synthetic resin slide guide 88 which is engaged with a wire harness protector 87. The supporting plate 89 is formed integrally with a clamp holding portion 90 at the front portion thereof. A clamp 91 is fixed to the clamp holding portion 90 to hold a wire harness 92 between the clamp holding portion 90 and the clamp 91.

The clamp 91 is made of synthetic resin and provided with a harness insertion groove 93, engagement recesses 94 positioned on both sides of the insertion groove 93, fixture protrusions 95 formed within the engagement recesses 94, and tape wind portions 96 for fixing wire harness fixing protruding from the upper and lower ends of the insertion groove 93, as shown in FIG. 12. The clamp holding portion 90 of the supporting plate 89 is provided with engagement holes (fixture means) 97 which are engaged by the fixture protrusions (fixture means) 95 of the clamp 91. The clamp 91 and the clamp holding portion 90 as a whole constitute a wire harness supporting point.

The wire harness 92 is inserted into the insertion groove 93 of the clamp 91 and fixed thereto at the tape wind portions 96 with use of vinyl tape (not shown). By fixing the clamp 91 to the clamp holding portion 90, the wire harness 92 can be swung about the clamp 91 along the supporting plate 89. Since the wire harness 92 is fixed to the clamp holding portion 90, the stress of the swinging portion 92a will not be conveyed to the wire harness 92. The aforementioned slide guide 88 is formed integrally with or separately from the inner door panel and has a guide groove 99 which is engaged with the protrusion 98 of the protector 87. The outgoing portion 92a of the wire harness 92 is swung by the sliding movement of the protector 87.

Figure 13:
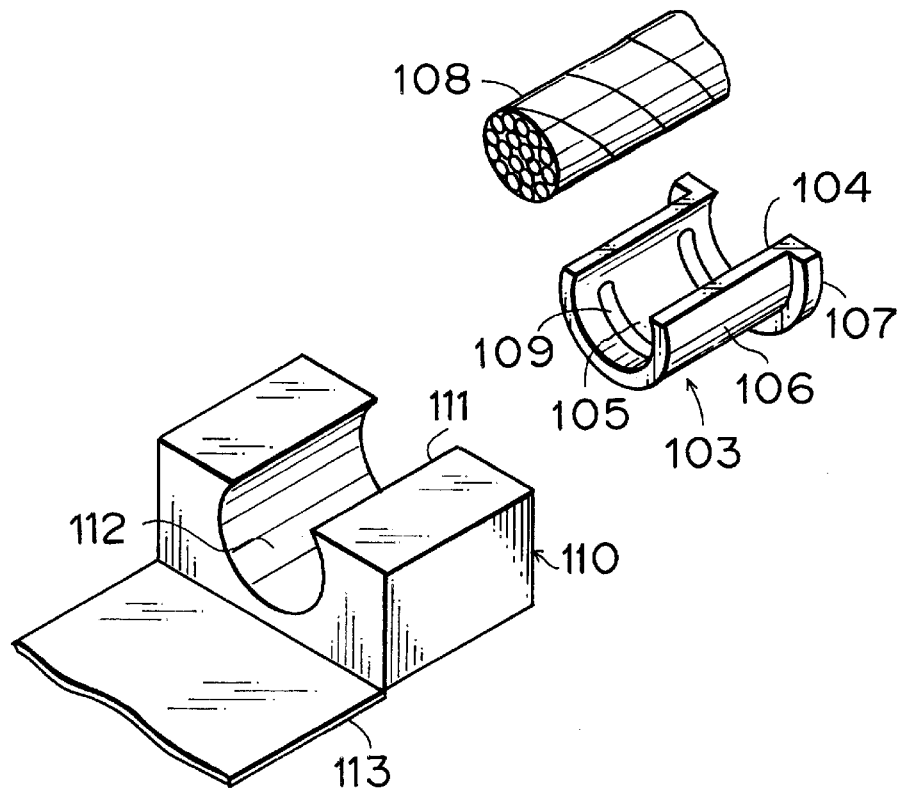
FIG. 13 is an exploded perspective view showing a second embodiment of the wire harness supporting portion.
Figure 14:
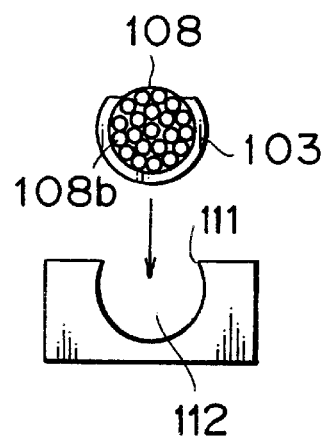
FIG. 14 is a front view illustrating a state of supporting the wire harness.

FIGS. 13 and 14 show another embodiment of the harness supporting portion. A clamp 103 of this embodiment is made of synthetic resin and constituted by a semi-cylindrical body 106 and a flange portion 107 protruding radially from the semi-cylindrical body 106. The semi-cylindrical body 106 has a cutout 104 and a harness insertion groove 105. The semi-cylindrical portion 106 further has convex strips 109 in a circumferential direction which engage with a wire harness 108. The clamp 103 is contractible by the cutout 104.

On the other hand, a clamp holding portion 110 has an opening 111 into which the clamp 103 is inserted and a semicircular engagement groove 112 is continued to the opening 111. The clamp holding portion 110 is formed on a supporting plate 113 in this embodiment, however, it may be formed directly on the inner door panel.

The wire harness 108 is firstly inserted into the clamp 103 through the cutout 104. Then, the clamp 103 is force fitted into the engagement groove 112 through the opening 111, as shown in FIG. 14, or it is force fitted from the side opening of the engagement groove 112. With this configuration, the clamp 103 is pressed in a direction of contraction and, consequently, the wire harness 108 can be fixed firmly. If the diameter of the clamp 103 is varied correspondingly to the diameter of the wire harness 108 (i.e., number of wires 108b), a suitable clamp 103 can easily be used according to the grade or type of vehicle.

Figure 15:
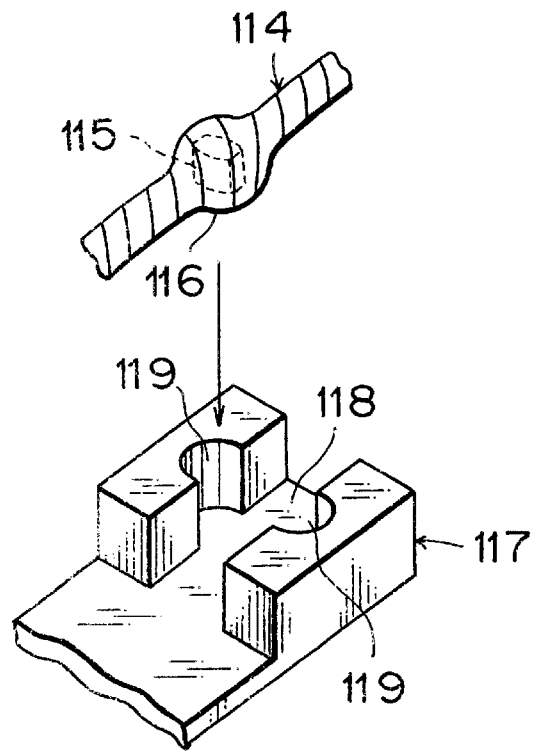
FIG. 15 is an exploded perspective view showing a third embodiment of the wire harness supporting portion.
Figure 16:
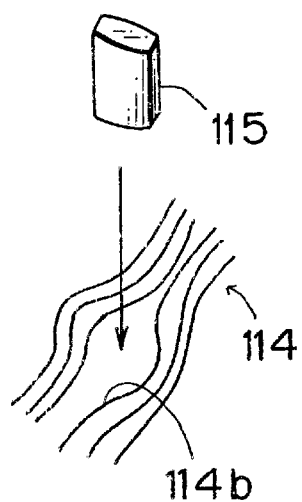
FIG. 16 is an exploded perspective view illustrating a state of forming the clamping portion of FIG. 15.
Figure 17:
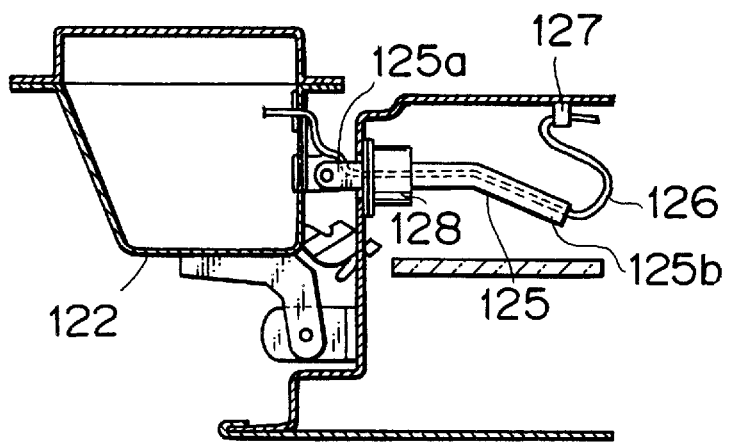
FIG. 17 is a cross sectional view showing a door being closed according to a conventional structure for installing a wire harness within a vehicle door.
Figure 18:
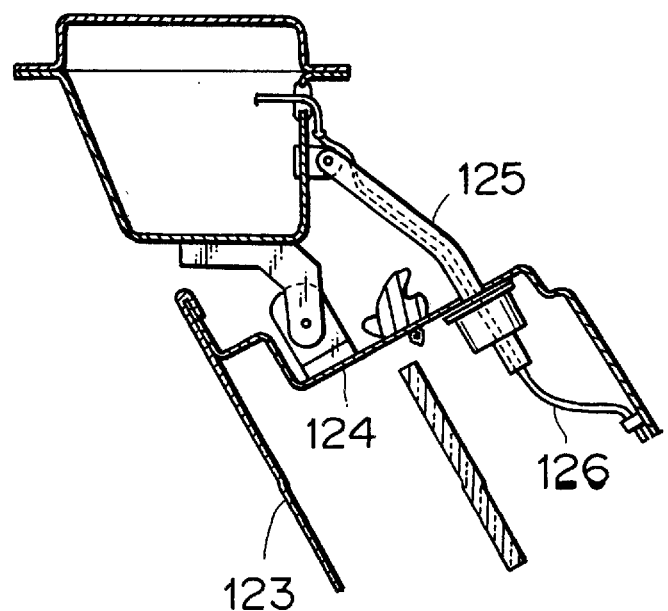
FIG. 18 is a cross sectional view showing the door being opened according to the conventional structure.

FIGS. 15 and 16 show still another embodiment of the harness supporting portion. In this embodiment, a rectangular piece 115 is inserted into a wire harness 114. As shown in FIG. 16, the rectangular piece 115 is inserted between wires 114b and then vinyl tape is wound around the wires 114b. The wires 114b around the rectangular piece 115 are bulged and a protruded portion (clamp) 116 is formed. The protruded portion 116 is then held in a wire harness holding portion 117. The wire harness holding portion 117 has a wire harness insertion groove 118 and a pair of engagement recesses 119 having semi-circular cross section formed at the central portion of the wire harness insertion groove 118. The protruded portion 116 of the wire harness 114 is held within the pair of engagement recesses 119, and the wire harness 114 can swing about the protruded portion 116 as a supporting point. With this arrangement, the stress of the wire harness 114 due to the sliding movement of a protector (not shown) is suppressed from causing.

According to the present invention, as described above, the wire harness is swung about the supporting portion by the sliding movement of the wire harness. For this reason, there is no possibility that the wire harness is bent considerably within the door. Consequently, no unusual force acts upon the wire harness and the wire harness is prevented from any damages. Also, when the door is opened and closed, the length of the wire harness from the swing fulcrum to the protector is kept constant and therefore the looseness of the wire harness can be completely suppressed from causing. In addition, since the swinging portion of the wire harness is completely protected by the protector, there is no possibility that the swinging portion of the wire harness will be damaged by the door panel and the door trim. Furthermore, the swinging portion of the wire harness is completely protected within the case. By penetrating the supporting pin through the wire harness and by closing the cover, the head of the supporting pin is pressed by the abutting portion of the cover, thus the wire harness is prevented from slipping but of the supporting pin and the wire harness is reliably held. Moreover, since the supporting pin, the abutting portion, the case and the cover can be formed integrally from synthetic resin, the manufacturing cost is considerably reduced. In addition, the space within the door can be economized. The case is also formed integrally with the door trim, so that the manufacturing cost is also reduced. According to the aforementioned embodiments, the wire harness can be supported easily and reliably.

While the present invention has been described with reference to preferred embodiments thereof, the invention is not to be limited to the details given herein, but may be modified within the scope of the appended claims.

What is claimed is:

1. A structure for installing a wire harness within a vehicle door, comprising an arrangement wherein, an intermediate portion of a wire harness is engaged slidably with the vehicle door side and one end of said wire harness is connected to a vehicle body side;

an outgoing portion of the wire harness extending from the slidably engaged portion is installed obliquely toward the upper or lower portion of the vehicle door along the surface thereof; and said wire harness is supported at a position perpendicular to a direction in which said wire harness slides, whereby said outgoing portion of said wire harness is allowed to swing in accordance with the sliding movement of said wire harness.

2. The structure for installing a wire harness within a vehicle door as set forth in claim 1, wherein said wire harness is guided out from a protector which is slidably engaged with the vehicle door side.

3. A structure for installing a wire harness within a vehicle door, comprising an arrangement wherein, a wire harness is inserted into a protector, one end of which is slidably engaged with a vehicle door side and the other end of which is connected to a vehicle body side;

an outgoing portion of said wire harness from a sliding part of said protector is passed through a swinging portion of said protector; and one end of said swinging portion is rotatably connected to the sliding portion of said protector and the other end of said swinging portion is rotatably supported at the vehicle door side.

4. The structure for installing a wire harness within a vehicle door as set forth in claim 2 or 3, wherein a supporting point in a horizontal direction is set to be the center of a range in which said protector slides.

5. The structure for installing a wire harness within a vehicle door as set forth in claim 2 or 3, wherein a slidable engaging portion for a connecting shaft of said sliding portion or a supporting shaft at the vehicle door side is formed at one or the other end of said swinging portion.

6. A structure for installing a wire harness within a vehicle door, comprising an arrangement wherein, a wire harness is guided out from a protector and swingingly supported at a position perpendicular to a direction in which said protector slides;

said protector is slidably engaged with a case;

a wire harness supporting shaft is protruded from either said case or a cover which engages with said case; and an abutting portion is provided either on said cover or said case to abut upon said wire harness supporting shaft.

7. The structure for installing a wire harness within a vehicle door as set forth in claim 6, wherein said case is fitted into a recess of a door panel.

8. The structure for installing a wire harness within a vehicle door as set forth in claim 6, wherein said case is formed integrally with a door trim.

9. A structure for installing a wire harness within a vehicle door, comprising an arrangement wherein, a wire harness is guided out from a protector and swingingly supported at a position perpendicular to a direction in which said protector slides; and said wire harness is fixed to a clamp holding portion with a clamp which constitutes a supporting point for swinging.

10. The structure for installing a wire harness within a vehicle door as set forth in claim 9, wherein said clamp has a wire harness insertion groove and a wire harness fixing portion and is fixed to said clamp holding portion by fixture means.

11. The structure for installing a wire harness within a vehicle door as set forth in claim 9, wherein said clamp has a flexible semi-cylindrical portion into which said wire harness is inserted and said semi-cylindrical portion is press fitted into said clamp holding portion.

12. The structure for installing a wire harness within a vehicle door as set forth in claim 9, wherein said clamp consists of a bulged part of said wire harness by inserting a piece member into the wire harness and said clamp holding portion has an engagement recess which engages with the bulged part of said wire harness.

* * * * *